April 22, 1958

A. B. BLACKBURN 2,831,992

PERMANENT MAGNET ROTOR ASSEMBLY

Filed March 4, 1955

INVENTOR.
Alan B. Blackburn
BY
Craig V. Morton
His Attorney

United States Patent Office 2,831,992
Patented Apr. 22, 1958

2,831,992

PERMANENT MAGNET ROTOR ASSEMBLY

Alan B. Blackburn, Covington, Ohio, assignor to General Motors Corporation, Detroit, Mich., a corporation of Delaware Application March 4, 1955, Serial No. 492,203

6 Claims. (Cl. 310—156)

This invention pertains to dynamo electric machines, and particularly to a permanent magnet rotor assembly for dynamo electric machines.

Permanent magnet rotors for dynamo electric machines are usually composed of material commonly known as Alnico. This permanent magnet material comprises an alloy of aluminum, nickel, and cobalt, which alloy is not readily machinable. Thus, when a rotor core is made of Alnico, the rotor generally comprises a cylinder having a centrally cored opening therethrough. In order to connect the magnet core with a shaft so as to form a rotor assembly, the central opening is filled with matrix metal, a low melting point alloy, after which a hole is bored therethrough. The rotor shaft is ordinarily longitudinally splined, and the shaft is press fitted into the bore of the matrix metal. This type of construction is economical and satisfactory for most types of dynamo electric machines.

However, where the dynamo electric machine, be it a motor or a generator, is subjected to high ambient temperatures above the melting point of the matrix metal it is readily apparent that such a rotor assembly will not perform satisfactorily. Thus, if the matrix metal softens or melts, the driving connection between the shaft and the rotor will be destroyed, and the machine will be rendered inoperative. This invention obviates the temperature limitations of prior permanent magnet rotor assemblies by eliminating the necessity for a matrix metal driving connection between the shaft and the rotor. Accordingly, among my objects are the provision of means for directly drivingly connecting a shaft and a permanent magnet rotor core so as to form a rotor assembly; the further provision of a rotor assembly capable of being used in dynamo electric machines that are subjected to high ambient temperatures; and the still further provision of a dynamo electric machine including a rotor assembly of the aforesaid character.

The aforementioned and other objects are accomplished in the present invention by frictionally interconnecting a permanent magnet rotor core and a shaft to form a rotor assembly. Specifically, each end of the centrally cored opening in the Alnico magnet is ground to form an enlarged annular groove. A steel bushing is press fitted into the groove at each end of the permanent magnet. The grooves are of appreciably greater longitudinal extent than the sleeves inasmuch as the coefficient of expansion of Alnico is appreciably higher than that of steel.

After the steel bushings have been press fitted into the enlarged or counterbored ends of the core, the inner diameters of the bushings are machined so as to form concentric openings at each end of the core. Thereafter, a shaft is inserted through the bushings, one end of the shaft being formed with a shoulder that abuts a flange on one of the bushings. The other end of the shaft is threaded and receives a pair of spring washers, a plain washer, and a self-locking, elastic stop nut. When the nut is tightened against the washer assembly, the shaft and the rotor core will be drivingly interconnected. Moreover, the driving connection between the shaft and the rotor core will withstand a wide range of ambient temperatures heretofore impossible with permanent magnet rotor assemblies.

Further objects and advantages of the present invention will be apparent from the following description, reference being had to the accompanying drawing wherein a preferred embodiment of the present invention is clearly shown.

Figure 1:
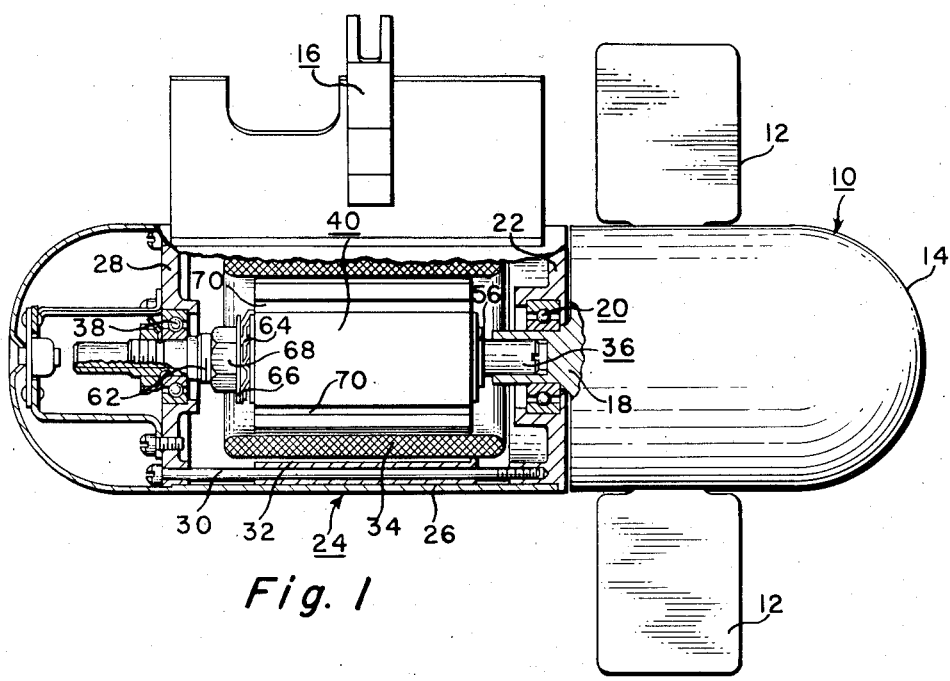
Fig. 1 is a view, partly in section and partly in elevation, of an air-driven generator embodying the rotor assembly of this invention.

With particular reference to Fig. 1, the rotor assembly of this invention is shown incorporated in an air-driven generator generally depicted by the numeral 10. The air-driven generator assembly 10 may include an impeller assembly including adjustable pitch blades 12 and a governor assembly, not shown, which is located within a rotatable spinner 14. The governor assembly may be of the type disclosed in copending application, Serial No. 420,277, filed April 1, 1954, in the name of Gerald E. Hook et al., and constitutes no part of this invention.

Air-driven generators of the type disclosed in the aforementioned copending application are designed for use as emergency equipment, and, thus, include a bracket assembly 16 by means of which the air-driven generator 10 may be suspended in the air stream of a moving aircraft. Inasmuch as the velocity of the air stream which impinges the air-driven generator assembly 10 may approach the speed of sound, it will be appreciated that the entire assembly 10 will be subjected to rather high ambient temperatures.

Figure 2:
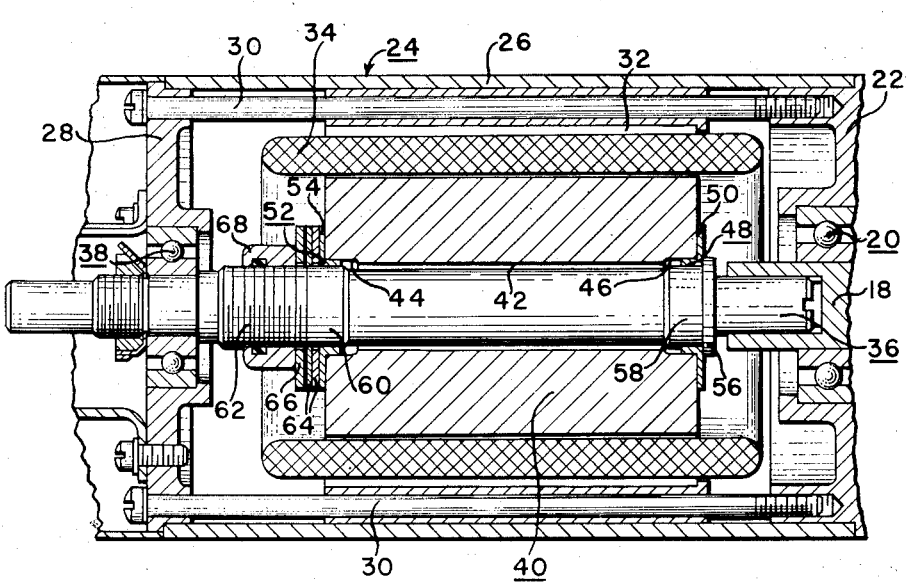
Fig. 2 is an enlarged fragmentary, sectional view illustrating the improved rotor assembly.

The impeller assembly of the air-driven generator 10 includes a hub 18, which is rotatably supported by a ball bearing assembly 20, the outer race of which is carried by end frame 22 of the generator 24. As depicted in Figs. 1 and 2, the generator 24 includes a cylindrical shell, or housing 26, which is supported by end frames 22 and 28. The end frames 22 and 28 are interconnected by a plurality of circumferentially spaced through bolts 30. The housing 26 supports a stator assembly 32 including a coil 34.

The hub 18 is drivingly connected to one end of a rotor shaft 36, the other end of the rotor shaft 36 being rotatably supported by a ball bearing assembly 38, the outer race of which is carried by the end frame 28. Thus, upon rotation of the hub 18, as effected by the impingement of air against the blades 12, the shaft 36 will be rotated.

The shaft 36 constitutes a component of the improved permanent magnet rotor assembly of this invention. As shown in the drawing, the rotor assembly comprises a permanent magnet core 40 composed of Alnico. Initially, the rotor core 40 comprises a cylindrical Alnico magnet having a centrally disposed, cored opening 42, and a plurality of longitudinally extending grooves 70 between which pole faces are formed. Inasmuch as it is well recognized that Alnico is very difficult to machine, the shaft and the rotor of prior art dynamo electric machines have usually been interconnected through matrix metal. As alluded to hereinbefore, the air-driven generator is oftentimes subjected to ambient temperatures above the melting point of matrix metal. Therefore, the shaft 36 cannot be drivingly connected with the rotor 40 by means of matrix metal.

Accordingly, opposite ends of the permanent magnet rotor core 40 are ground to form enlarged annular grooves 44 and 46, which grooves are coaxial with the cored opening 42. A steel bushing 48 having a radially extending flange 50 is press fitted into the annular groove 46. It should be noted that the portion of the bushing 48, press fitted into the groove 46, is substantially less than the longitudinal extent of the groove 46 to allow for the different coefficients of thermal expansion of steel and Alnico. Similarly, a steel bushing 52 having a radially extending flange 54 is press fitted into the annular groove 44. By press fitting the bushings 48 and 52 into the grooves 46 and 44, respectively, of the rotor core 40, the bushings 48 and 52 are drivingly interconnected with the rotor core 40 by frictional engagement therewith. After the steel bushings 48 and 52 have been press fitted into the grooves of the core 40, the inner diameters of the bushings are ground to assure concentricity thereof.

As depicted in the drawing, the shaft 36 is formed with an annular shoulder 56 adjacent one end. The shaft 36 is also formed with portions 58 and 60 of a diameter substantially equal to the inner diameter of bushings 48 and 52. In addition, part of the periphery of portion 60 is threaded, as indicated at 62.

In assembling the shaft 36 with the core 40 to form the rotor assembly, the left-hand end of the shaft 36, as viewed in the drawing, is inserted through the bushing 48 of the core and the shoulder 56 is moved into engagement with the radially extending flange 50 of the bushing 48. Thereafter, a pair of spring washers 64 are placed on the portion 60 of the shaft 36. The spring washers 64 are engaged by a washer 66 which is, in turn, engaged by an elastic stop nut 68. The elastic stop nut 68 is tightened on the shaft 36 to compress the spring washer 64, thereby drawing the annular shoulder 56 into frictional engagement with the bushing 48. Furthermore, the spring washers 64 frictionally engage the bushing 52 and in this manner, the shaft 36 is drivingly connected with the rotor core 40.

From the foregoing it is manifest that the improved rotor assembly will in no way be affected by high ambient temperatures. That is, the driving connection between the shaft and the permanent magnet rotor will not be subject to failure by reason of high ambient temperatures.

While the embodiment of the present invention as herein disclosed, constitutes a preferred form, it is to be understood that other forms might be adopted.

What is claimed is as follows:

1. A rotor assembly for dynamo electric machines subject to high ambient temperatures comprising, a permanent magnet rotor core having a centrally located bore with enlarged ends, a pair of bushings, said bushings having press fits into the enlarged ends of said bore, a shaft extending through the bore of said rotor core and having an annular shoulder disposed in abutting relation with one of said bushings, and means connected with said shaft and engaging the other bushing for drawing said shoulder against said one bushing so as to drivingly interconnect said shaft and said rotor core.

2. A permanent magnet rotor assembly for dynamo electric machines subject to high ambient temperatures including, an Alnico rotor core having a centrally located opening therethrough, opposite ends of said rotor core having an enlarged annular groove concentric with said opening, a pair of steel bushings, said bushings being press fitted into the annular grooves at opposite ends of said rotor core, a shaft extending through the opening in said rotor core and having an annular shoulder arranged to abut one of said bushings, and means threadedly connected with said shaft and engageable with the other of said bushings for drawing said shoulder into frictional engagement with said one bushing so as to establish a driving connection between said shaft and said rotor core.

3. A rotor assembly for dynamo electric machines subject to high ambient temperatures comprising, a permanent magnet rotor core having a central opening with enlarged ends, a pair of bushings, said bushings being press fitted into the enlarged ends of said opening, a shaft extending through the opening of said rotor core and having means arranged to engage one of said bushings, and means connected with said shaft and engaging the other bushing for establishing a frictional driving connection between said shaft and said rotor core.

4. A rotor assembly for dynamo electric machines subject to high ambient temperatures comprising, a permanent magnet rotor core having a central opening, opposite ends of said rotor core having an enlarged annular groove concentric with said opening, a pair of bushings having press fitted engagement with said annular grooves at opposite ends of said rotor core, a shaft extending through the opening in said rotor core and having means arranged to engage one of said bushings, means slidably arranged on said shaft and engaging the other of said bushings, and a nut threadedly connected with said shaft and engaging said last recited means for frictionally interconnecting said shaft and said rotor core.

5. A rotor assembly for dynamo electric machines subject to high ambient temperatures comprising, a permanent magnet rotor core having a centrally located opening therethrough, opposite ends of said rotor core having an enlarged annular groove concentric with said opening, a pair of steel bushings, said bushings being press fitted into the annular grooves at opposite ends of said rotor core and having radially extending flanges, said bushings being of lesser longitudinal extent than the enlarged annular grooves, a shaft extending through the opening in said rotor core and having an annular shoulder arranged to abut one of said bushings, a spring washer assembly slidably supported on said shaft and engaging the other of said bushings, and a nut threadedly connected with said shaft and engaging said spring washer assembly for drawing said shoulder into frictional engagement with said one bushing so as to establish a driving connection between said shaft and said rotor core.

6. In a high temperature dynamo electric machine having a pair of end frames and a cylindrical shell, a stator having windings carried by said cylindrical shell, a rotor disposed for rotation within said stator comprising a permanent magnet core having a central opening therethrough with enlarged ends, a shaft rotatably supported in said end frames and extending through the opening in said core, a pair of bushings having press fitted engagement with said core in the enlarged ends thereof, and means carried by said shaft for establishing a driving connection between said shaft and said core due to frictional engagement with said bushings.

References Cited in the file of this patent

UNITED STATES PATENTS

| 2,503,346 | Meredith | Apr. 11, 1950 |
| 2,632,123 | Kober | Mar. 17, 1953 |

FOREIGN PATENTS

| 201,087 | Switzerland | Feb. 1, 1939 |
| 703,248 | Germany | Mar. 5, 1941 |